Figures 1, 2:
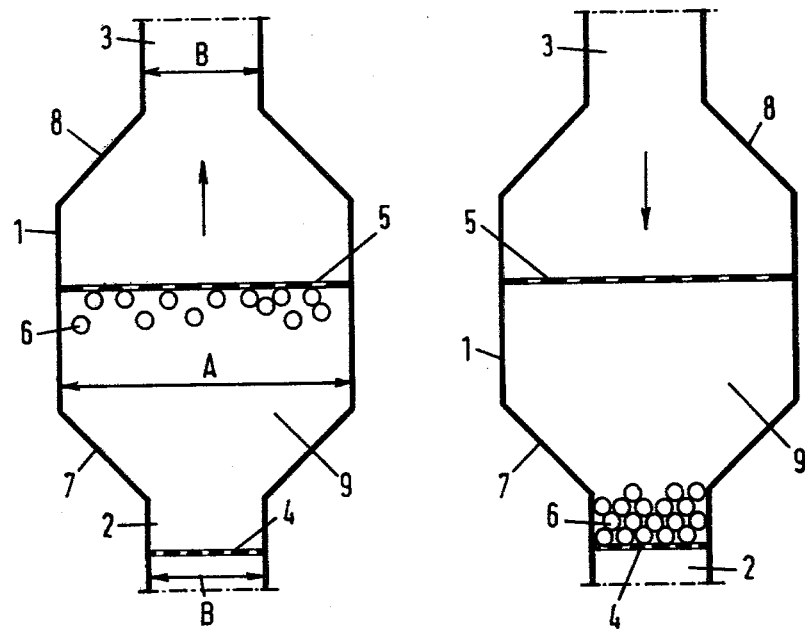

United States Patent [19]

Essebaggers

[11] 4,187,874

[45] Feb. 12, 1980

[54] FLUID DIODE

[75] Inventor: Jan Essebaggers, Nieuwerkerk aan de Ijssel, Netherlands

[73] Assignee: B.V. Neratoom, The Hague, Netherlands

[21] Appl. No.: 847,441

[22] Filed: Nov. 1, 1977

[30] Foreign Application Priority Data

Nov. 8, 1976 [NL] Netherlands .................. 7612384

[51] Int. Cl.² .............................................. F16K 15/04
[52] U.S. Cl. .............................. 137/533.11; 137/512.1
[58] Field of Search ................ 137/512.1, 533.11, 493, 137/599

[56] References Cited

U.S. PATENT DOCUMENTS 1,579,543 4/1926 King ........................ 137/533.11 X
3,320,971 5/1967 Hemenway ...................... 137/512.1
4,023,591 5/1977 Short .............................. 137/512.1 X Primary Examiner—William R. Cline
Attorney, Agent, or Firm—Kenyon & Kenyon

[57] ABSTRACT

The invention provides a fluid diode comprising a chamber between a supply pipe and a discharge pipe, in which chamber there are present balls within a space defined by two grids. The grids and balls are such that the grid at the side of the supply pipe with certainty can be shut off almost completely when a reverse flow occurs, whereas the other grid never can be shut off by the balls. A preferred embodiment is given in FIG. 1. The grid at the side of the discharge pipe may also be a perforated plate provided with bulges of different heights.

4 Claims, 3 Drawing Figures

FLUID DIODE

The invention relates to a fluid diode comprising a through-flow chamber wherein end at least one supply pipe and one discharge pipe, which through-flow chamber has a diameter larger than that of the supply pipe.

There are known various types of check valves, among which may be reckoned also fluid diodes, inter alia those comprising a ball. Such check valves are so designed that a normal through-flow from the supply opening is not impeded, but that in case of a reverse flow the ball functions as a shut-off for the supply opening.

Check valves are employed in all kinds of systems wherein an undesirable reverse flow is possible. Some of these systems are subjected to severe security regulations. An example of such a system is the heat transport system of a sodium-cooled nuclear reactor. In order to be able to cope with failures, such a system consists of a number of separate parallel loops, each comprising a pump, heat exchanger and check valve of its own. If one of the pumps fails, the other loops can see to the heat transport. For that purpose it should be ensured, however, that not a great portion of the transport medium flows through the defective loop. Conventional check valves, including those comprising a ball, may fail, for example, because the ball remains stuck in a position where it does not shut off the supply opening.

It is the object of the invention to provide a fluid diode which with absolute certainty reduces the reverse flow to an acceptable quantity by a strongly increased flow resistance.

According to the invention, this object is effected by the fact that the through-flow chamber contains a plurality of balls within a space defined by two grids, which grids are so designed that in case of a flow from the through-flow chamber into the direction of the supply pipe the balls can shut off the grid at the side of the supply opening almost completely, but in case of the normal flow into the direction of the discharge pipe they cannot shut off the grid at the side of the discharge opening.

Owing to the construction of the present fluid diode using a relatively great number of balls it is possible with absolute certainty to prevent the complete backflow of the flowing medium, because perhaps one single ball may remain stuck, but by far the greater part certainly not.

Various embodiments of the grids are conceivable, as a result of which the grid at the side of the supply opening, in case of a flow from the through-flow chamber into the direction of the supply pipe, can be shut off almost completely by the balls, and the grid at the side of the discharge opening in case of the normal flow cannot be shut off by the balls. Preferably there are employed flat grids, the grid at the side of the discharge opening having a larger surface than the other grid. It is also possible to design the grid at the side of the discharge opening as a perforated plate provided with bulges of different height in such a manner that the grid cannot be shut off by the balls.

The invention will now be further explained with reference to a preferred embodiment given in the drawings.

In FIG. 1 is schematically drawn the situation of a fluid diode according to the invention at a normal flow from the supply opening in the direction of the arrow.

In FIG. 2 is schematically drawn the situation of a fluid diode according to the invention at a reverse flow in the direction of the arrow.

Figure 3:
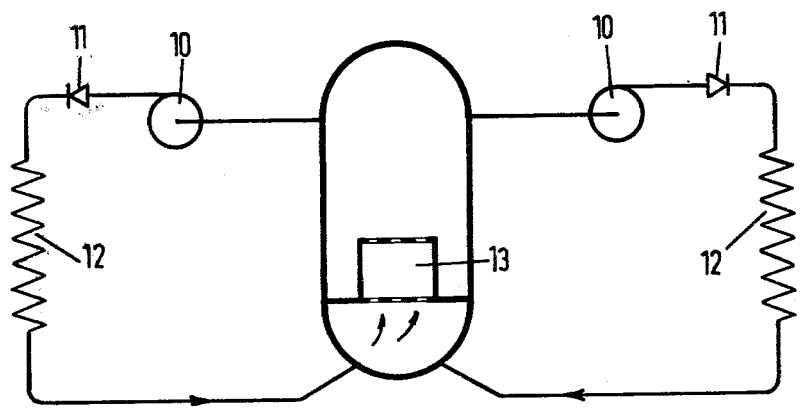

In FIG. 3 is schematically drawn a multiple loop reactor system, in which the fluid diode according to the invention can be employed.

DESCRIPTION OF FIGS. 1 and 2

The fluid diode consists of an enclosed chamber (1) of a cylindrical shape connected to an entrance nozzle (2) and an exit nozzle (3) by two cones (7) and (8), respectively, and forming an aparatus through which a gas or fluid can flow by connecting same to a piping system by means of nozzles (2) and (3).

Within the chamber (1) there is positioned a grid (5) while in the entrance nozzle (2) there is positioned another grid (4), the diameter of which is smaller than the former. In this way there is formed between the two grids (4) and (5) a separate chamber (9) wherein are placed a number of balls (6), the diameter of which is larger than the diameter of the holes in the grids. In this manner the balls are captured between the two grids (4) and (5) of chamber (1).

The weight of each ball could be either less than, equal to, or more than that of the fluid passing through the aparatus. Diameter "A" of the chamber (1) is larger than the connecting nozzle diameters "B" of nozzles (2) and (3). In addition, the balls may differ in size and weight.

WORKING OF THE APPARATUS

In FIG. 1 the apparatus is connected to a piping system at the connecting ends or nozzles (2) and (3) while a fluid passes through the chamber (1) (normal flow direction). The balls (6) in chamber (9) are moved into the upward direction against grid (5) and are held there in that position. The number of holes in the grid (5) is much greater than the number of balls (6) while the flow passage over the balls and through the holes in grid (5) is relatively easy and causes little flow resistance to the fluid.

In case the fluid reverses as shown in FIG. 2, the fluid will move the balls downwards until they are stopped by grid (4) in nozzle (2) where the balls are collected, however, in a now much smaller flow passage above the smaller grid (4). In this situation the balls are stacked on top of each other forming a rather large flow resistance to the reversing flow.

The total pressure drop of the apparatus during the reversed flow situation as shown in FIG. 2 can be a multiple value of the pressure drop in the normal flow direction (FIG. 1). Theoretically, any ratio between pressure drop in the reverse flow relative to the normal flow direction can be reached, while in practical terms a ratio of 100 or better is possible.

Application (FIG. 3)

An example wherein the fluid diode can be applied is a multiple loop reactor system as commonly used for the Liquid Metal Fast Breeder Reactor, wherein the entrance chamber to the reactor is fed by two or more parallel sodium loops to cool the nuclear core (13). The normal direction of flow in the sodium loops is indicated by means of arrows. Each of these parallel loops normally contains a pump (10), a check valve (11) and a heat exchanger (12). In case one of the pumps in a two-loop system fails to operate under power conditions of the reactor, the other pump alone must be able to cool the core while, in addition, the check valve in the failed loop must be closed. In case also that the check valve in the failed loop does not function properly, there is a risk that the flow from the operating pump will by-pass the core through the failed loop. In that case the core will be overheated and may melt down, which could be catastrophic.

An example of such a system is shown in schematic form in FIG. 3.

For this application it is imperative that there are used check valves that cannot fail. The normal check valves presently known in general consist of a single body in a fluid stream which allows the flow to pass in one direction, but does not permit the flow to reverse, in case it works. However, in practice it appears that for all practical valves the single body to prevent flow reversal freezes in the open position and does not close when necessary.

In the fluid diode there are used a multiple of relatively small balls, of which it is very unlikely that they will all freeze in one position. Therefore, the fluid diode will be more reliable for systems of which the safety is of utmost importance.

TYPICAL DIMENSIONS

The size of the apparatus is not limited and will be determined by the system for which it is used and by the desired characteristics. The diameter of the chamber "A" would in general be at least two times the diameter of the entrance of exit nozzle "B". The diameter "B" will be determined by the allowable flow velocity, which for a sodium system maximally will be in the order of 30 ft/sec., while the cross-section of the open area in the grids should be maximized to minimize pressure drop in the normal flow direction. The size of the balls and the weight thereof are determined by the required characteristics of the fluid diode for the system in which it is operating.

An extensive development program will be required to optimize the dimensions of the apparatus and to determine its characteristics.

I claim:

1. A fluid diode for permitting fluid flow in a normal direction while substantially preventing reverse flow in the opposite direction, said fluid diode comprising:

a chamber having an inlet end adapted to be connected to a fluid supply pipe and an outlet end adapted to be connected to a fluid discharge pipe;

a first substantially flat pervious grid mounted adjacent to the inlet end of the chamber such that all fluid flowing through the chamber between the inlet and the outlet passes through said first grid;

a second substantially flat pervious grid mounted in the chamber and spaced from the first grid in the direction of the outlet end, the cross-sectional area of the chamber being larger at the location of the second grid than the cross-sectional area at the location of the first grid, and the area of the second grid being substantially greater than the area of the first grid; and a multiplicity of balls confined in the chamber between said first and second grids, the balls being freely movable from one grid to the other grid in response to changed direction of fluid flow through the chamber, and the aggregate volume of the balls being such that the balls can shut off the first grid against reverse fluid flow from the outlet end to the inlet end but cannot shut off the second grid in the case of normal flow from the inlet end to the outlet end.

2. A fluid diode according to claim 1 wherein the chamber tapers inwardly between the second grid and the first grid to provide a smooth transition between the larger cross-sectional area at the location of the second grid and the smaller cross-sectional area at the location of the first grid.

3. A fluid diode according to calim 1 wherein the balls differ in size.

4. A fluid diode according to claim 1 wherein the balls differ in weight.

* * * * *